(12) United States Patent
Flerlage et al.

(10) Patent No.: US 6,858,667 B1
(45) Date of Patent: Feb. 22, 2005

(54) RELEASABLE ADHESIVE FOR ATTACHMENTS OF SUBSTRATES AND JOINTS

(75) Inventors: Horst Flerlage, Lippstadt (DE);
Simone Rohrberg, Lippstadt (DE);
Stephan Schmidt, Lippstadt (DE);
Ulrich Temme, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 644 days.

(21) Appl. No.: 09/715,138

(22) Filed: Nov. 20, 2000

(30) Foreign Application Priority Data

Nov. 24, 1999 (DE) .......................................... 199 56 422

(51) Int. Cl.[7] ................................................ C08K 3/00
(52) U.S. Cl. ....................................................... 524/504
(58) Field of Search ........................................ 524/504

(56) References Cited

U.S. PATENT DOCUMENTS

| 3,987,122 | A | 10/1976 | Bartz et al. |
| 4,009,793 | A | 3/1977 | Minesinger et al. |
| 4,024,312 | A | 5/1977 | Korpman |
| 4,305,996 | A | 12/1981 | Schenk |
| 4,461,633 | A | 7/1984 | Bodovsky |
| 4,775,076 | A | 10/1988 | Horvath |
| 5,470,622 | A | 11/1995 | Rinde et al. |
| 5,560,706 | A | 10/1996 | Yamazaki et al. |
| 5,672,402 | A | 9/1997 | Kreckel et al. |
| 5,827,591 | A | 10/1998 | Blok et al. |
| 5,870,955 | A | 2/1999 | Williams et al. |
| 5,886,111 | A | 3/1999 | Chiotis et al. |
| 5,897,949 | A | 4/1999 | Luhmann et al. |
| 6,482,281 | B1 * | 11/2002 | Schmidt .................... 156/108 |

FOREIGN PATENT DOCUMENTS

| DE | 1604736 | 1/1971 |
| DE | 33 31 016 A1 | 10/1984 |
| DE | 3331016 | 10/1984 |
| DE | 4339604 | 5/1995 |
| DE | 195 64 425 A | 8/1996 |
| EP | 0 957 147 A | 11/1999 |

* cited by examiner

Primary Examiner—Edward J. Cain
(74) Attorney, Agent, or Firm—Birch, Stewart, Kolasch & Birch, LLP

(57) ABSTRACT

A hot-melt adhesive contains a non-pressure-sensitive adhesive that is fluid at application temperatures and that is removable, residue-free, by peeling at small peel angles. The adhesive contains additives selected from the group consisting of fillers, stabilizers, dyes, carbon black, and moisture absorbents. The adhesive also containing the following: a) thermoplastic elastomers that may be grafted, b) grafted and poly-α-olefins, c) polyisobutylene or a softening oil, d) adhesive resin, and e) end block resin.

20 Claims, 5 Drawing Sheets

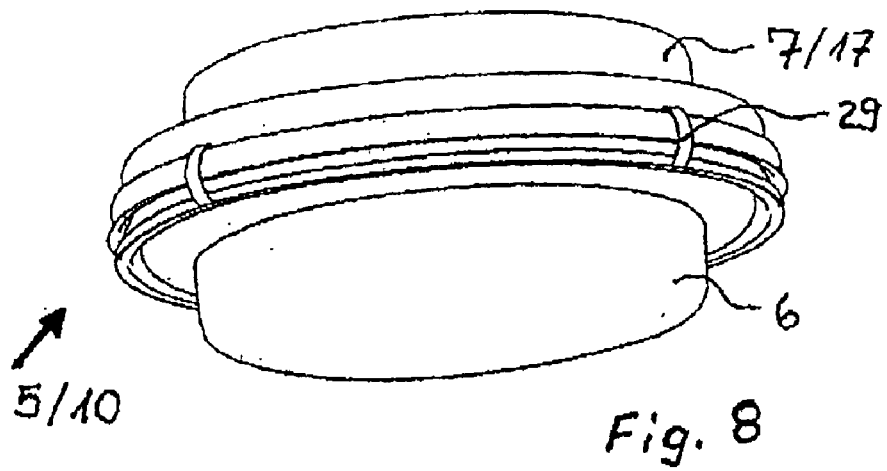
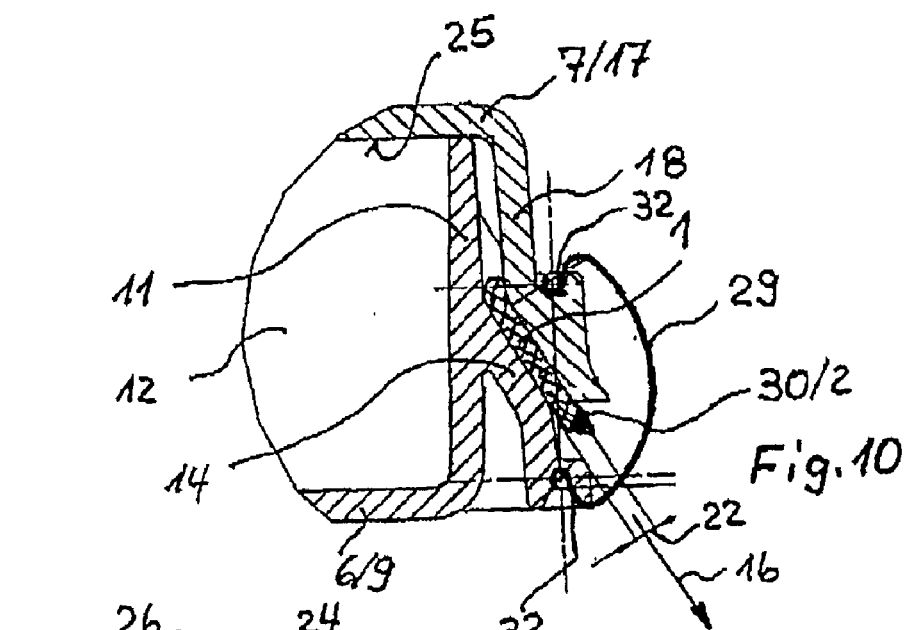
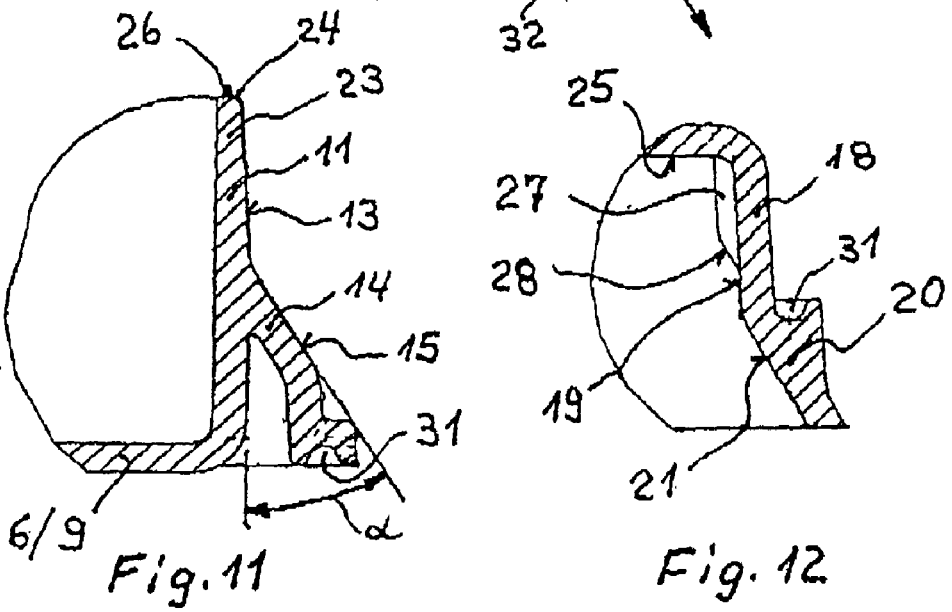

RELEASABLE ADHESIVE FOR ATTACHMENTS OF SUBSTRATES AND JOINTS

This application claims priority of German Application No. 199 56 422. 1, filed Nov. 24, 1999, the entire contents of which are hereby incorporated by reference.

BACKGROUND OF THE INVENTION

1. Field of the Invention

The invention provides adhesives for the releasable attachment of substrates, in particular glass-like plastic substrates, to thermoplastic or duroplastic plastic substrates, and the use of same for the releasable attachment of light covers to lamp housings of automobile lights or automobile headlights, as well as automobile lights or automobile headlights produced using said adhesives.

2. Description of the Related Art

The technology relates to a joint between first and second assembly parts having adjoining side walls, which may be tightly joined together by means of a sealing bed that may be provided with a removable adhesive sealant.

The technology further relates to a method for producing a joint between first and second assembly parts, whereby a removable adhesive sealant in a liquid state is applied to a sealing bed area of the first assembly part, and both of the assembly parts are joined together.

In particular for automobile headlights, joints are known where a first assembly part, such as a headlight housing, has a U-shaped sealing bed on a first side wall into which a second assembly part, such as a closure disk or cover disk, having a second side wall is insertable, such that both of the assembly parts may be joined with a seal.

A disadvantage with the known joints is that, for use of such U-shaped sections, the adhesive sealant cannot be easily withdrawn upon removal, since undercuts and corners present may pose the danger of tearing-off. In order to remove the adhesive sealant, both assembly parts must be disassembled beforehand, and the adhesive sealant must be removed with great effort.

As a result of the increasing interest in the recycling the components of used products, there is a need for attachment techniques that allow easy assembly and disassembly.

A known joint seal is described in DT 1 804 736 where the side wall of a first assembly part has a U-shaped sealing bed, into which the side wall of a second assembly part is inserted. After joining together of same, an adhesive sealant is introduced into the sealing bed via lateral openings. The disadvantage here is that the adhesive sealant is very difficult to remove without leaving residue.

Known hot-melt adhesives can be produced in cartridges or barrel-like cylinders, or as slab-stock blocks (separated from each other by adhesive-coated paper), for example. When cartridges are used, frequently the entire quantity of adhesive is heated and processed using a hand applicator. For larger barrel-like cylinders, a heated stamp in a stationary arrangement, with removal and delivery lines, is placed on the hot-melt adhesive surface, and removed only from the surface area. In this manner, only a portion of the hot-melt adhesive is heated. Since the hot-melt adhesive is force-fed, there are no strenuous requirements on the flow characteristics this type of application technique.

An associated disadvantage is insufficient repeat releasability and residual adhesion of the hot-melt adhesive to the substrates after they are separated.

In the current art, products from Beiersdorf AG, Hamburg, under the description "powerstrips," are known that represent releasable but pressure-sensitive adhesive attachments in the sense of the present invention.

The pressure-sensitive adhesive strip can be removed by pulling on a handle in the direction of the adhesive plane. The substrates and adhesive strip are recovered and the materials separated (DE 43 39 604 A and DE 33 31 016 A).

U.S. Pat. No. 4,024,312 also describes the principle based on the adhesive strip. This patent is follows others, having the common feature that an adhesive strip comprising a pressure-sensitive adhesive (PSA), applied at ambient temperature, is exclusively used, which is preferably provided with a strongly stretchable, tear-resistant reinforcement backing. This backing is necessary, as described in the adhesive strip description, to prevent tearing off of the adhesive film before final removal from the adhesive joint. Since flat shapes are hereby attached to one another, tearing off of the adhesive strip is very likely, resulting in inconvenience to the user, as is described in DE 43 39 504 A.

U.S. Pat. No. 4,009,793 describes a releasable attachment between a lid and a storage container by using a heat-activated shrinking adhesive strip with simple overlapping on the ends. The adhesive strip is wrapped around the area to be sealed, and the shrinking process is thermally induced. The adhesive strip is provided with a reinforcement backing to assure repeat releasability. A particular disadvantage of this method is that it is impossible to tightly bond different objects to one another if the surface contour changes from a convex to a concave curved shape. A further disadvantage lies in the fact that a customary adhesive strip must be removed with application of great force to effect an integral separation of the individual components. Accordingly, the last item was not achieved by this patent.

Adhesives allowing releasable attachments are also described in U.S. Pat. No. 4,305,996. A polyol is required for polyurethane-based materials, which permits the desired low viscosities when contact adhesives are formulated with said polyol. The PSA described in said patent is designed to be removed repeatedly at a peel-off angle of 180°. The production of an adhesive strip thus necessarily conforms to this requirement. A PSA is prepared as an adhesive strip before the actual joining process, and is attached to the substrates by application of pressure on the adhesive strip.

Another technique to seal joined housing parts is described in U.S. Pat. No. 4,775,076. This method is suitable only with the limitation that the housing parts to be joined must have cylindrical shape in the joint area. At ambient temperature, flexible sealant is cut to length and inserted into the cylindrical joint area of the first substrate, the second substrate with its cylindrical surface is placed against said first substrate. By external action on the joint area, the sealing material is brought to the melting point by increasing the temperature and applying pressure to assure bonding or adhesion of the substrates to or onto one another. This operation does allow release, but not an integral separation.

Further proposals for releasable attachments of a plurality of substrates, in the form of adhesive strips, among others, are described in U.S. Pat. No. 5,897,949 as a PSA adhesive strip with foamed reinforcement backings; in U.S. Pat. No. 5,827,591 as a PSA-laminated paper; in U.S. Pat. No. 5,672,402 as a PSA adhesive strip having a non-elastic reinforcement backing in the embodiment; and in U.S. Pat. No. 5,470,622 with an artificially aged adhesive having a reinforcement backing that is shrunk using temperature.

Other examples of releasable attachments of a plurality of substrates to one another have come from the field of lithographic printing, whereby the layer creating the imprint is designed to be removable from the calender roll, which is arranged as a cylindrical core, to enable print copy to be exchanged for economy of material and time. In U.S. Pat. No. 5,870,955 it is proposed, after completion of printing of the desired number of print copies, that the actual print layer from the foundation, that is, the core and adhesive, be peeled off and discarded. In order to release the print layer from the foundation, it is proposed that heating the entire structure allows elimination of the internal bond and separation of the attachment. Care must be taken that the acrylate adhesive itself is tearable, and that adhesion to the core is achieved. The adhesive is applied to said roll as a film.

U.S. Pat. No. 4,461,663 describes a corresponding method for a releasable press-on layer of a roller core. Releasablity is effected by heating the entire structure, and the upper press-on layer is separated from the foundation by peeling off. This adhesive is applied as a hot melt. In this type of separation procedure, the hot melt becomes soft and may lose its cohesiveness.

In the past, it has been proposed to use gels—made, for example, from silicones used in potting applications in the electronics field—for releasable sealants for headlight systems in the automotive field. However, four main disadvantages have been identified. These systems are applied in the liquid state into a standard sealing bed, which heretofore has been customarily U-shaped for headlight systems, and must be cured for some time either before or after joining, and additional attaching elements are necessary. Since silicone-based materials do not have good adhesion to polypropylene without pretreatment, a further disadvantage results from this special application. The attachment is not secure against penetration by a concentrated water jet, such as from a high-pressure cleaner. Quantities of a mobile silicone softening oil are present, as is also described in U.S. Pat. No. 5,886,111. This latter disadvantage must be eliminated if materially corresponding systems of other designs are used.

This type of sealant design enables the joint parts to be released from one another by pulling the substrates apart.

Also known in the current art is a headlight system from Ichikoh, Japan, wherein a gel-like material that easily adheres to the surface is used. This system has a very low modulus in addition to high reversion capability, and is applied in a heretofore "classical" U-shaped sealing bed of an automobile headlight. After a hardening process, the base of the closure disk is pressed into the material, and is held in this position by means of a number of circumferentially arranged fastening elements. This material allows the sealing disk to be manually removed, although with application of great force, from the attachment after removal of the safety elements. To this end, both substrates themselves must be pulled. A further disadvantage of this system lies in the fact that a narrowly concentrated water jet from a high-pressure cleaner, shooting through the attachment between sealant and substrate, cannot be prevented when this area is affected. In the construction design of said system, a rubber sealant must be applied in the liquid state and held under constant pressure to assure a positive supported sealing function from the slight adhesion.

In order to achieve the object of a releasable attachment of a sealing disk to a headlight housing, U.S. Pat. No. 5,560,706 describes a non-adhesive sealant that is foamed into the U-shaped adhesion bed. The seal tightness is assured according to the invention by sufficiently high pressure forces, which are achieved by means of mechanical clamping systems. To this end, the foamed material must be cured before joining, thus requiring considerable time and apparatus in the form of a sufficiently long curing process. At an ambient temperature of approximately 100° C., said foamed sealant experiences stress relaxation and the headlight becomes loosened, thus representing a further disadvantage. After the article thus produced is used, the headlight can be opened after being removed from the clamps.

As a result, there is a great need for an adhesive substance that can be used on variously shaped substrates in a commercial production process, and that permits a residue-free, simple release of the attached components from one another after use. As an example of this ever-increasing need, automobiles in the future will have to be capable of virtually complete disassembly and material recycling, although the hitherto increasing prevalence of this adhesion method has been classified as non-releasable. The various releasable attachment techniques cited above all have significant disadvantages. Releasable adhesive strips are unsuitable in commercial production for surfaces with complex shapes, with the typically occurring gap tolerances and high handling expense. Meltable hot-melt adhesive substances, which permit softening and subsequent cohesive failure of the adhesive, are likewise unsatisfactory due to the heating step and residual adherence of the adhesive. In particular, for large-surface adhesion or sealing with typically small surface loads, directly applicable adhesives or adhesive sealants are very advantageous, especially for residue-free removal.

Such applications could include adhesive sealants for inner paneling, splash guard flaps, and bumpers for automobiles, as well as frame and window sealants in the construction and automotive fields, vibration- and sound-damping silencers, and other similar commercial applications.

In general, all lighting devices for automobiles, produced using hot-melt adhesive sealants, are classified as releasable. To this end, the entire structure must be heated, and the substrates are separated by pulling away from one another. A residue of adhesive sealant thus typically remains on the substrates.

SUMMARY OF THE INVENTION

An object of the invention is to provide repeat-releasable attachments between substrates, whereby additional mechanical securing elements may be used. Following the separation process, the individual parts are materially separated. This concerns in particular the sealing of housings and covers by adhesive sealants, whereby achievement of the aforementioned objective is especially suited for lighting devices for automobiles. A released attachment is also considered materially separated in the sense of the present invention if microscopically identifiable films of adhesive resin still remain on said substrates. Said films should typically have layer thicknesses less than 5 $\mu$m, but preferably should be undetectable.

The aforementioned objective is achieved in the first embodiment by means of non-pressure-sensitive adhesive materials that are removable with no residue by peeling at small peel-off angles and that are fluid at the application temperature.

A fundamental feature of the present invention is an adhesive substance that can be applied as a liquid in order to create repeat-releasable adhesive attachments between substrates, whereby additional mechanical safety elements may be used. These substrates or assembly parts involve solid bodies made of materials that are more rigid in the direction of the joint plane than is the adhesive substance.

Examples of materials used as substrates include natural raw materials such as wood; materials that can be processed into fibers and fabrics; modified natural materials such as duroplastic caseins; thermoplastic cellulose derivatives such as cellulose nitrates, acetates, mixed esters, and ethers; natural inorganic materials such as stone; artificially produced inorganic materials such as concrete, cement, pressed and sintered materials, glass, such as soda-lime-silica, borosilicate, phosphate, and quartz glass; and enamels.

Metals, for example, are included as artificial inorganic materials. Among these, steels are particularly suited, preferably easily formable steels, especially St3 to St7, DX 52 to DX 55, and DC 03 to DC 06. Said steel surfaces generally undergo an inorganic surface tempering, such as hot-dip treatment with Al according to DIN EN 10154, electrolytically applied Zn layers, electrolytic zinc-nickel coatings according to DIN 16231, DIN 1624, DIN 17163, DIN EN 10152, and SEW 0954, and chromed surfaces that are Al-plated, with or without chromed surfaces according to DIN 1824 and DIN 1544, or EN 10139 and EN 140, respectively. Additional coatings containing organic binders may follow, such as paints, PVC coatings, or films, electrodip paints, aqueous paint systems, and powder lacquers.

Furthermore, nonferrous materials such as Al 99.85, from soft to hard, are suitable following an anodizing process and optional painting and PVC film lamination, as well as CuZn alloys of varying composition according to DIN 179, which can subsequently be plated with copper, nickel, and/or chrome. Suitable metallic substrates also comprise magnesium- and zinc-based die-castable compositions, which can be modified by galvanization and wet lacquering or powder lacquering, for example according to DIN 1725 or DIN 1743, respectively.

Especially suited are stainless steels of varying compositions, which can be modified by bright-nickel or bright-chrome plating, and by paint coating systems, for example according to EN 10088-1 or EN 10088-8, respectively.

Suitable anticorrosive paints are selected from the group of polyanilines and Zn-containing paints, for example. Electrodeposited substrates include Cu, Ni, Cr, Ag, Au, and so-called chemical nickel from electroplating baths that are anodically oxidized, phosphated, or chromated layers with 10% phosphorus, Zn in the "blank," "yellow," and "black-olive," Zn/Ni with approximately 12% Ni in the "yellow" and "black" modifications, and Zn/Ni with 2.5% to 15% Pb, anodized aluminum or phosphate or chromated coatings.

Examples of artificial organic substrates include polycondensed duroplasts such as phenol, UP (unsaturated polyester), urea and thiourea, melamine, alkyd, allyl, silicone, polyimide, polybenzimidazol resins, and polycondensed thermoplastic materials such as polyamide, polycarbonate, polyester, polyphenylene oxide, polysulfone, and polyvinyl acetate, as well as polybutylene terephthalate, polyethylene terephthalate, and polyoximethylene.

Of the thermoplastic polymers, particularly suited are polyethylene, polypropylene, poly-1-butene, poly-4-methyl-1-pentene, polyvinyl chloride, polyvinylidene chloride, polyvinylidene fluoride, polymethyl methacrylate, and copolymers of same with maleic anhydride; imides of polyacrylates, polyacrylonitrile, polystyrene, polyacetal, fluoroplastics, polyvinyl alcohol, polyvinyl acetate, poly-p-xylylene, polyvinylcarbazole; ionomers and aliphatic polyketones or polyetherketones; polyvinyl pyrrolidene, styrene-acrylonitrile copolymers, cycloolefin copolymers, or acrylonitrile-styrene-acrylic ester copolymers. In addition, adhesion to polyadducts such as epoxy resins, linear and crosslinked polyurethanes and polyureas from sterically hindered diamines reacted with aliphatic diisocyanates, and cyanate-ester resins can be achieved.

The listed plastics can also be used in combinations with one another as so-called "blends" to form a suitable substrate. Also suitable as substrates are thin surface layers created by modification of said substrate itself by non-coating gases, in this case Ar, $N_2$, $O_2$, and air, with excitation by direct current voltage, alternating current voltage, mid- and high-frequency radiation or microwave radiation, UV light, and laser activation, for example.

Also suitable are thin layers that are vapor-deposited onto a metal, such as metal layers. Said layers comprise, for example, Al, Cr, steel, Cu, Ag, Au, or In, created by thermal vapor deposition, electron beam vapor deposition, or sputtering.

Dielectric layers suitable for substrates can also be created by thermal or electron beam vapor deposition, sputtering, and plasma CVD (chemical vapor deposition). Suitable are oxides such as $SiO_x$, $Ti_xO_x$, $CeO_2$, $Al_2O_3$, and the fluoride $MgF_2$.

Indium-tin oxide represents a suitable conductive coating, which is created in the same manner as for the aforementioned oxide layers.

Suitable as substrates are plasma polymer layers composed of the monomers hexamethyldisiloxane, 1,1,1,3,3,3-hexamethyldisilazane, tetraethylorthosilicate, and other hydrocarbons that are gaseous and liquid at standard conditions, alcohols such as methanol, and aromatics produced by plasma CVD or plasma polymerization.

Hard coating layers, for example nitrides, carbides of the transition metals such as Ti and W, and ADLC layers are also suitable substrates.

In addition, dye layers of inorganic dyes and organic substances capable of precipitation, such as phthalocyanines and rhodamine dyes, are suitable substrates.

Coatings such as powder lacquers, wet lacquers, or pastes applied to various foundations are suitable as substrates following curing. These coatings are based on acrylic resins, chlorosulfonated polyethylene, epoxy resins, ethylene vinyl acetate resins, melamine formaldehyde resins, chlorinated polyethylene, phenol-formaldehyde resins, polymethyl methacrylate, polytetrafluoroethylene, polyurethane resins, polyvinyl acetate resins, polyvinyl butyral resins, polyvinyl chloride resins, polyvinylidene chloride resins, polyvinylidene fluoride resins, polyvinyl fluoride resins, chlorinated rubbers, cyclized rubber resins, block polystyrene-block polybutadiene resins, silicone resins, urea-formaldehyde resins, and unsaturated polyester resins, for example. Moreover, suitable coating materials are designed based on asphalt, tar, and polyurethane-tar combinations.

The adhesive according to the invention is applied in pumpable, predominantly liquid form to the substrate to be attached. Additional substrates can be placed on said applied, fluid adhesive and thus be attached thereto.

As a measure of fluidity, the viscosity at the time of adhesive application and joining of all substrates is greater than $\eta=10^{-2}$ Pas and less than $\eta=5\times10^6$ Pas, each at a shear rate of $\gamma=10/s$ and greater than $\eta=10^{-1}$ Pas and less than $\eta=5\times10^7$ Pas, each at a shear rate of $\gamma=0.1/s$ and determined by a cone/plate or plate/plate viscosimeter. The viscoelastic damping factor tan ($\delta$), determined by using a mechanical-dynamic spectrometer, is preferably greater than 0.8 and particularly preferably greater, than 1.5 during adhesive application. All viscoelastic data of tan($\delta$), G", and |G*| are determined in the linear-viscoelastic region of the material properties.

Application is followed by material hardening of the adhesive substance to an essentially elastomeric solid body. The adhesive substance displays great elasticity and high ductility until torn, when the same is deformed. The material hardening can result from decreased temperature, chemical crosslinking, other aggregate formation, or a combination of these.

During hardening, the damping factor tan(δ) falls to a value less than half of the tan(δ) value of the adhesive during application, preferably less than a value of tan(δ)=0.5.

The adhesive is present in a working temperature range above the glass temperature of the elastomer phase. The glass temperature is defined as the maximum of the loss modulus G", which belongs to the main dispersion of the elastomer phase. When the glass temperature thus defined is exceeded, the shear modulus of the complex typically drops by approximately two to three orders of magnitude, to approximately $|G^*|/[Pa] \sim 10^5$.

The complex shear modulus $|G^*|$ of the suitable material lies between $2 \times 10^2$ Pa and $5 \times 10^7$ Pa, preferably between $5 \times 10^3$ Pa and $5 \times 10^6$ Pa, determined at a measured frequency of 107 =1/s and a temperature that is approximately 30 K higher than the glass temperature defined above.

The adhesion of the adhesive to the suitable substrates, determined by a surface adhesion test, is less than the maximum tear resistance of said adhesive.

An object of the invention is to improve the conventional joints, in particular the geometric design of the sealing bed of same, such that the adhesive substance can be removed substantially residue-free, without costly pre-assembly or danger of tearing off.

This objective is achieved by the invention in conjunction with the preamble of claim 1, such that the first side wall has a first sealing surface attached thereto, the first side wall in the joined state running at a distance approximately parallel to a second sealing surface attached to a second side wall, and that both of the sealing surfaces form a sealing bed with a level running direction, directed away from both side walls, in whose extension the adhesive sealant can be withdrawn.

Because both sealing surfaces form the sealing bed, with a running direction directed away from both sides, the adhesive sealant must not be pulled over undercuts and corners upon removal. Accordingly, the adhesive sealant can be withdrawn simply and essentially residue-free from the sealing bed without previous disassembly of both assembly parts. In this manner, there is practically no danger of tearing off.

According to a preferred embodiment of the invention, the running direction of the sealing bed is inclined toward the first side wall at an angle of inclination α. This angle of inclination α has a value between 10° and 90°. By the incline of said angle of inclination α, both assembly parts can thus be centered simultaneously. However, centering may also be achieved via a centering shoulder at the second assembly part, which preferably has a sloped bevel for ease of insertion of the first assembly part.

According to a further preferred embodiment of the invention, both assembly parts are fixed in position with one another by means of the fastening means adjoining the sealing surfaces. By the use of this fastening means, such as C-shaped springs, clamps, or catching hooks, the assembly parts can be fixed in position relatively easily.

According to a further preferred embodiment of the invention, the first side wall makes contact with a front face, disposed at the free end of the same, against an inner surface of the second assembly part. This front face has conical tips against which the inner surface of the second assembly part can be pressed. By means of the conical tips, shrinkage occurring with the adhesive sealant during cooling can be counteracted. The conical tips can be deformed by subsequent pressing of the second assembly part. During this pressing procedure, the second assembly part can then be finally fixed into position using the attachment means.

The joint according to the invention is especially suited for lighting devices for automobiles, because there is a particular need for a material separation for recycling purposes. A released attachment is also considered materially separated in the sense of the present invention if microscopically identifiable films of adhesive resin still remain on the substrates. These films should typically have layer thicknesses less than 5 μm, but preferably should be undetectable.

The hot-melt adhesive sealants according to the invention are particularly suitable for attachment of glass and glass-like plastic substrates to thermoplastic or duroplastic plastic substrates. The substrates to be joined in the automobile light and headlight region are made of, in particular, polypropylene as the housing material, glass and polymethyl methacrylate, polycarbonate or cycloolefin copolymer as materials for the cover disks, headlight lenses, or light disks. However, other plastics can also be used for this purpose. For all sealant and adhesive problems as well as for lights, the original, or, by means of the preceding molding process, the specified substrate surface is not significantly modified.

This is different for headlights having plastic lenses, as a result of the scratch-resistant coating. Here, sufficient adhesion to the base of the headlight lens must be created on a film of different possible substrate surfaces with fluid changes in properties.

A further embodiment of the invention, therefore, encompasses automobile lights or automobile headlights comprising a light disk made of glass, a glass-like plastic substrate, and a lamp housing made of thermoplastic or duroplastic plastic substrate, characterized in that said light disk and said lamp housing are attached with a hot-melt adhesive sealant as defined above.

The known methods for producing a joint have the aforementioned disadvantages of joints.

A further object of the invention, therefore, is to improve the known methods so that the adhesive sealant can be removed relatively simply and completely.

This object is achieved by the invention, in conjunction with the preamble of claim 28, such that, to remove the adhesive sealant, same is grasped at a free end and withdrawn from the sealing bed in an extension of a level running direction of said sealing bed, directed away from both assembly parts.

Because the adhesive sealant is withdrawn from said sealing bed in an extension of a level running direction of said sealing bed, directed away from both assembly parts, tearing off of said adhesive sealant is avoided. The sealant is removed essentially residue-free from said sealing bed without the need for disassembling the assembly parts beforehand.

According to a further preferred embodiment of the invention, the adhesive sealant is applied as a liquid to the sealing bed area by means of a tank melt unit with robotic guidance. The adhesive sealant may thus be applied easily, quickly, and uniformly. The two assembly parts can then be joined either manually or automatically.

According to a further preferred embodiment of the invention, after joining of the second assembly part and a brief cooling phase, the second assembly part is pressed against the first assembly part and finally fixed into position using attachment means. Subsequent pressing of the second assembly part allows the conical tips, arranged on the front face of the side wall of the first assembly part, to be deformed by this second assembly part. The position of the second assembly part can then be fixed, using the attachment means, during this pressing procedure.

Further particulars of the invention arise from the following detailed description and the attached drawings, wherein preferred embodiments of the invention are exemplarily illustrated.

BRIEF DESCRIPTION OF THE DRAWINGS

The drawings show the following:

FIG. 8: A three-dimensional view of a joint, in a reduced representation, FIG. 10: An enlarged representation of individual unit X illustrated in FIG. 9 with adhesive sealant, FIG. 11: A side view of a first side wall of the first assembly part illustrated in FIG. 10, and FIG. 12: A side view of the second side wall of the second assembly part illustrated in FIG. 10.

DETAILED DESCRIPTION

Figure 1:
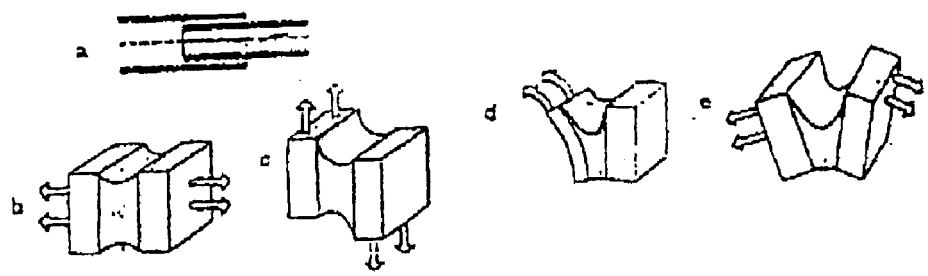
FIG. 1: A representation of various load stresses on an adhesive attachment.

A joint 5 essentially comprises a first assembly part 6, a second assembly part 7, a sealing bed 8, and an adhesive sealant 1.

The first assembly part 6 is constructed as a housing base 9, for example of a headlight housing 10, and has a circumferentially disposed side wall 11. On an outer side 13 of said first side wall 11, facing a housing interior 12, is arranged a lower sealing bed section 14 having a first sealing surface 15. The first sealing surface 15 is inclined toward the first side wall 11 at an angle of inclination, α, which can be, for example, 30°. With its angle of inclination α, the first sealing surface simultaneously specifies the running direction 16 of the sealing bed 8. The running direction inclines similarly toward the first side wall 11 by the angle of inclination α.

The second assembly part 7 is constructed as a housing cover containing a transparent cover disk 17 of the headlight housing 10, and has a circumferentially disposed side wall 18 that adjoins the first side wall 11 of the first assembly part 6. On an inner side 19 of said second side wall 18, facing a housing interior 12, is arranged an upper sealing bed section 20 having a second sealing surface 21. In the joined state, the second sealing surface 21 is disposed at a distance 22 from both of the assembly parts, parallel to the first sealing surface 15, Thus the second sealing surface 21 is similarly inclined toward said first side wall 11 by the angle of inclination α. Both of the sealing surfaces 15, 21 thus adjoin the sealing bed 8, which comprises the lower sealing bed 14 and the upper sealing bed 20.

The first side wall 11 has, on its free end facing the second assembly part 7 or the cover disk 17, a front face 24 that contacts an inner surface 25 of the second assembly part 7 or the cover disk 17.

In an example of the embodiments, the front face 24 has conical tips 26 that can be pressed against the inner surface 25 such that said conical tips deform and support the lateral positional fixing of both assembly parts 6 and 7.

A centering shoulder 27 is premounted to the second side wall 18, on its inner side 19 facing the first side wall 11. The centering shoulder has, on its end facing the inner surface 25 of the second assembly part 7, a sloped bevel 28 that contributes to the correct positioning of both of the assembly parts 6 and 7.

Both sealing bed sections 14, 20 have recesses 31 into which the ends 32 of the C-shaped attachment means 29 may be inserted.

In order to join the two assembly parts 6 and 7, the adhesive sealant 1 is applied as a liquid to the sealing bed area of said first assembly part 6, that is, on the first sealing surface 15, by means of a tank melt unit with robotic guidance (not shown). The second assembly part 7 is then joined over said first assembly part 6, so that the front face 24 makes contact against the inner surface 25. The two assembly parts 6, 7 can be joined either manually or automatically.

After joining of the second assembly part 7 and a brief cooling phase, the second assembly part 7 is pressed against the first assembly part 6 and finally fixed into position using attachment means 29, such as C-shaped springs, whose ends 32 are inserted under tension into the recesses 31 of the sealing bed sections 14 and 20. Subsequent pressing of the second assembly part 7 allows the conical tips 26, arranged on the front face 24 of the first side wall 11 of the first assembly part 6, to be deformed by the second assembly part 7. An additional effect is that shrinkage occurring with the adhesive sealant 1 during cooling can be counteracted.

After joining the two assembly parts 6 and 7, they can be reseparated by using a section 30 of the adhesive sealant 1, or of an extra section attached to the adhesive sealant, which protrudes from the joint plane or the sealing bed 8 as a "handle" or "opener." To this end, the adhesive bond of the attachment or the two assembly parts 6, 7 is released by pulling on the "handle" in the direction of the adhesive plane, that is, in an extension of the level running direction 16 of the sealing bed 8, directed away from both assembly parts 6 and 7, so that the adhesive sealant 1 is withdrawn from the sealing bed 8 without leaving a residue.

To this end, the adhesive substance or adhesive sealant must have a minimum tear resistance, which is determined in a tensile strength test at a deformation rate of 500 mm/min and a free sample length of 30 mm to 100 mm. The tear resistance thus determined is preferably greater than 300%, most preferably greater than 800%.

The relaxation characteristics of the adhesive are determined on a sample having a free clamping length of 30 mm to 100 mm, a feed rate of 1900 mm/sec, and an elongation of 300%. Thus, the adhesive permits a tension drop of no less than 35% of the maximum tension after 10 seconds, and no less than 25% of the maximum tension after 80 seconds. Preferably, the tension drop is not less than 50% after 10 seconds, and not less than 40% after 120 seconds.

According to the invention, it was established that highly elastic adhesives had the special property that, depending on the direction of pull or the peel-off angle, extremely variable values were obtained for adhesion to the substrates. It could be shown that, for peel-off angles greater than 90°, cohesion failures in the middle range of the hot-melt bead resulted on both of the aforementioned substrates, at a high level of pull-off force, while the releasability at small peel-off angles, that is, <30°, resulted in full adhesion at a comparatively low level of pull-off force.

Model formulations were compounded in order to investigate this property to the extreme. Sample formulations were mixed according to the invention, containing a high percentage of elastic and fewer less relaxing components. Using these hot-melt sealants, sealed headlights could thus be produced that could be reopened. For the first time, no residue of the sealant was left behind on the substrates. It was noteworthy that opening could be achieved by two mechanisms without adding limitations to the hypothesis:

1) The closure disk was pressed with great force out of the adhesive bed, opposite to the joint direction. This was barely possible by manual means, and posed the risk of destroying the disk.
2) The hot melt could be withdrawn from the sealing bed, on a handle formed during application, at an angle of 90° relative to the joint direction, similar to a rubber seal for a preserving jar. This could be performed using a small amount of force.

These procedures are based on a general principle not limited to any particular class of elastomeric materials. This is of great value, from a practical standpoint, for allowing the use of easily producible, easily openable cover/housing seals with a clean separation into the housing, cover, and sealant components, without residual adherence of materials to one another. The aforementioned tests revealed two disadvantages of the previous sealing bed design with regard to reopening:

1) Because the sealing substance lies, volume-wise, in two main compartments on both sides of the base of the closure disk, the sealing substance situated in the interior of the headlight must be pulled through the narrow area under the base in order to be withdrawn.
2) The sealing substance must cover a larger width across the sealing bed line in order to compensate for deformations without too great an elongation of the material or constriction.

In this regard, it is important that the repeat-releasability does not result in premature failure during use for the deformations, temperatures, and forces that hereby arise, and as a function of the load time and under the influence of media. To this end, the following theoretical considerations are presented.

When using an adhesive attachment of this embodiment, forces act upon individual locations of the assembly parts to be joined, which are determined by the rigidity of these materials, distributed in two dimensions over the adhesive sealant. The individual load forms that can occur are shown in FIG. 1.

The load form, by which the substrates are fixed and by which a high deformation is created only at the adhesive sealant according to the invention, does not appear during use. The type of criterion between the application forms of "use" and "disassembly" of such an attachment can thus be clarified. In general, the cohesive resistance of such an adhesive sealant must be higher than the adhesive resistance. It therefore follows that the construction of said attachment must be designed in a suitable fashion to achieve the desired result.

The adhesive sealant for producing such an attachment is preferably prepared as a pumpable material, and is applied to the adhesion and sealing region of the substrates. In this regard, hot-melt adhesive sealants are preferred that have very rapid setting characteristics and that can be used in commercial manufacturing processes. A simplified production sequence is thus achieved, and production steps requiring time and equipment, as well as those indirectly involving assembly of the desired product, can be minimized.

For loads that occur during operation, the adhesive sealant does not transmit higher mechanical strain from one substrate to another that could lead to impairment of either of the substrates. Deformations in the attachment preferably occur at high and at very low temperatures. On the other hand, the compliance of the adhesive sealant is so slight that, for loads at any point of same—such as those arising from the impaction of a concentrated water jet from the nozzle of a high-pressure cleaner—the attachment does not experience failure due to loosening. Good adhesion to the substrates is necessary to assure a tight seal.

Release is carried out at ambient temperature, whereby the adhesive sealant itself is pulled. In this manner, an outwardly protruding handle, such as one that is formed from said adhesive sealant, or applied thereto, and/or inserted into same, is pulled, during which one or several of the joined parts are fixed.

Figure 2:
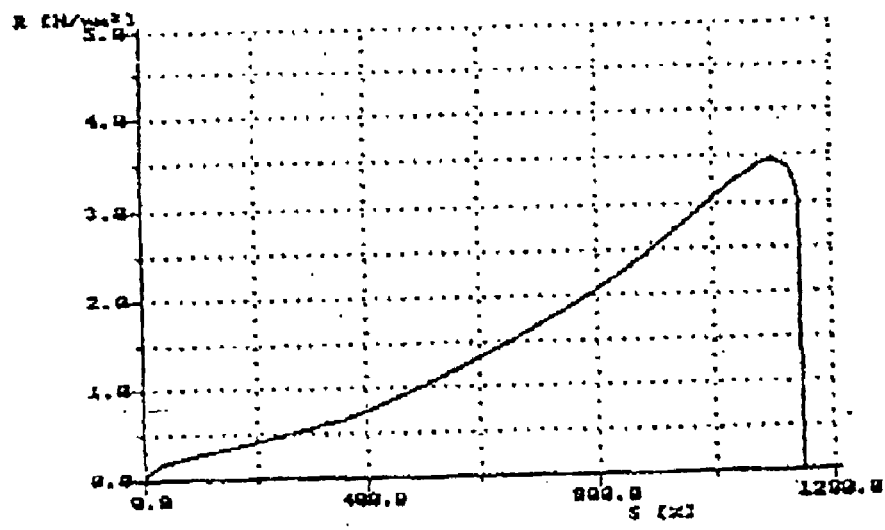
FIG. 2: An elongation test on a test object composed of the material from exemplary formulation 1.
Figure 3:
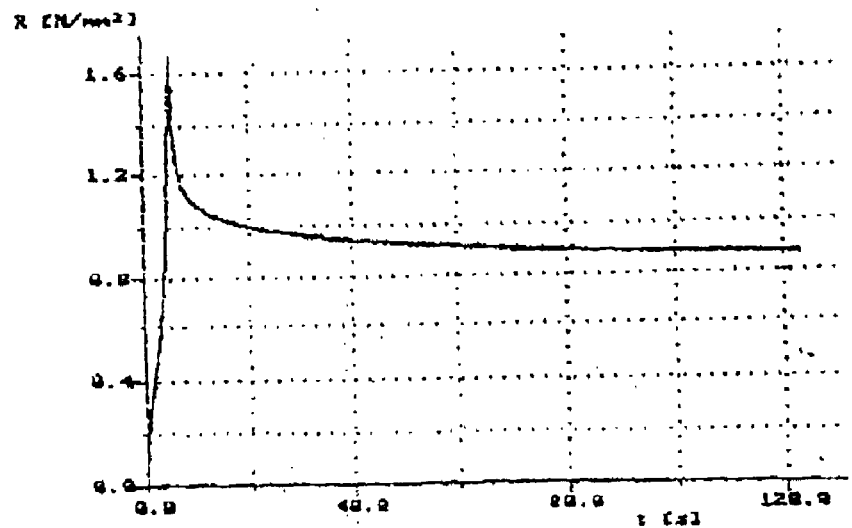
FIG. 3: A relaxation test on a test object composed of the material from exemplary formulation 1, after an elongation of 300%.

In the release procedure, the adhesive sealant must display a high transverse contraction during tensile stress to enable removal from the substrates. To this end, the material should have high elasticity with a ductility >300%, preferably, >800%, without tearing off (see FIG. 2). FIG. 2 shows an elongation test on a test object composed of the material from exemplary formulation 1. In addition, there must be no significant stress relaxation for the duration of the repeat-release procedure (see FIG. 3). FIG. 3 shows a relaxation test on a test object composed of the material from exemplary formulation 1, after an elongation of 300%.

Figure 4:
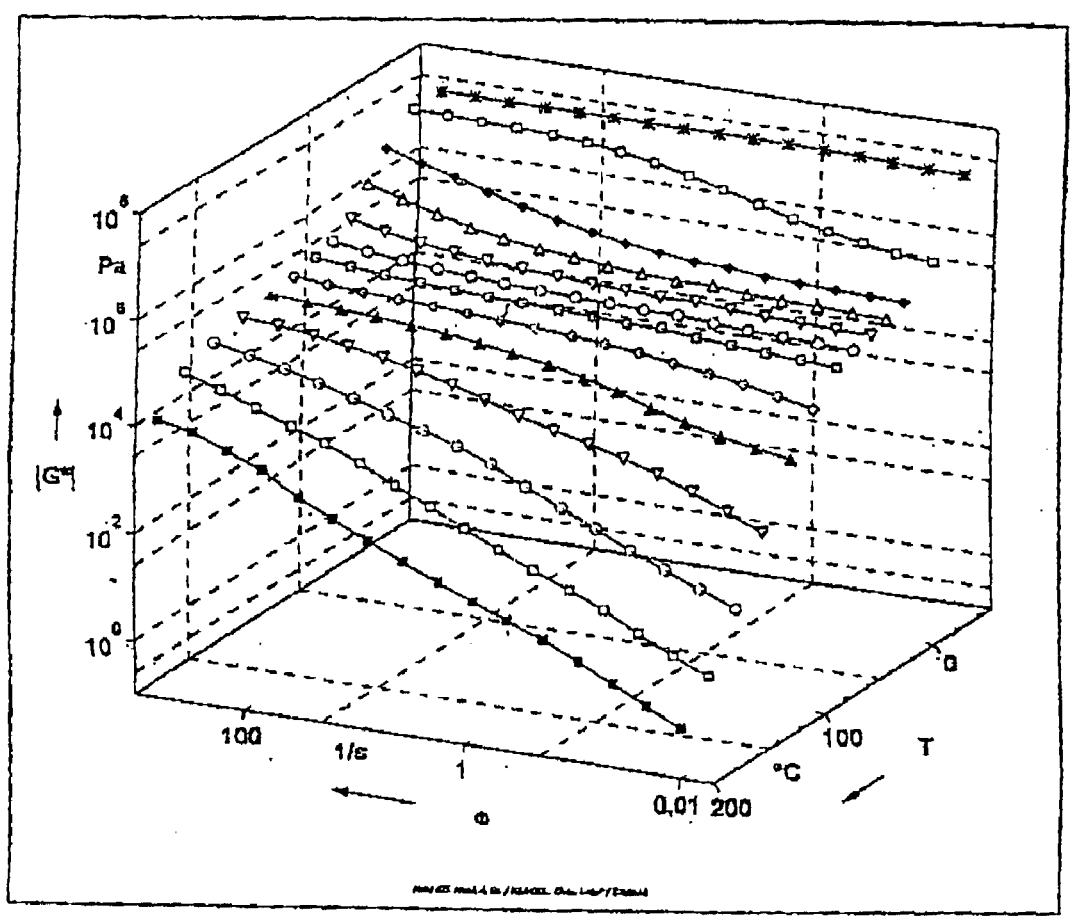
FIG. 4: Viscoelastic spectra of the material from exemplary formulation 1, as a function of the temperature, determined in the linear-viscoelastic region of deformation.

If an elastomeric material is in the temperature range above its glass transition and is elongated, a transverse contraction occurs. The glass transition is measured by known methods, using an oscillating mechanical spectrometer. It is of interest to identify the region of the load time, expressed as the inverse of the measuring frequency, in which the glass transition occurs in a material. A criterion for said glass transition is the drop in the storage modulus G', or the maximum of the loss modulus G". In this regard, FIG. 4 shows viscoelastic spectra of the material of exemplary formulation 1, as a function of the temperature, determined in the linear-viscoelastic region of deformation. The transverse contraction can now be described as follows:

$$\frac{\Delta b}{b} = \frac{-\mu \times \Delta s}{a} \quad (I)$$

where b is the thickness of the volume element at an angle of 90° to the direction of pull, and a is the length of the volume element in the direction of pull.

Figure 5:
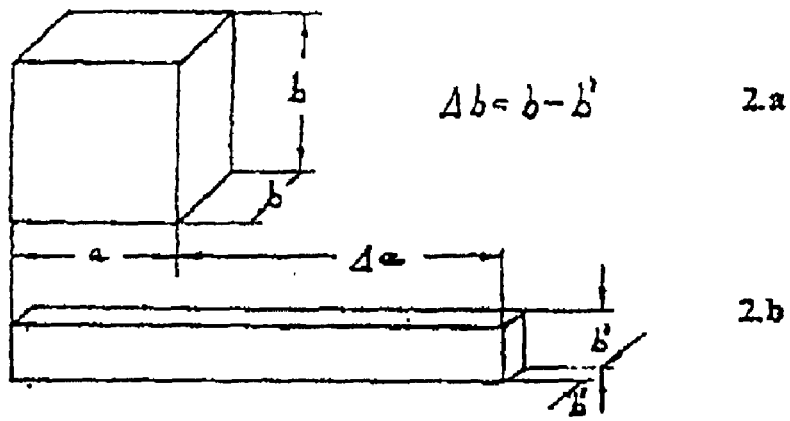
FIG. 5: An element of an elastomeric object before (2.a) and after (2.b) an elongation.

FIG. 5 shows an element of an elastomeric object before (2.a) and after (2.b) elongation.

In this regard, the transverse contraction $\mu$ of an elastomeric object is approximately 0.500. If a bead made of such a material is pulled from an aperture, a strong transverse contraction appears in the adhesive sealant, which is no longer directly attached to the substrate (se FIGS. 6 and and 7). In the adjoining area between said bead and said substrate, which is the foremost tear front, a very high tension is now observed. This area thus experiences failure if the adhesive sealant bead is continuously pulled until all the adhesive sealant, free of residue, is released from said substrate. In this procedure, the value of the adhesive strength of said adhesive sealant on said substrate is exceeded in the continuous tear. In order that the bead being withdrawn does not "block," the transverse contraction must be sufficiently great that said adhesive sealant in the elongated state always has a smaller diameter than any constrictions that may be present, such as a constriction of the sealing bed and along the path of withdrawal. A large transverse contraction is created by high deformations.

In order that the material in such a procedure does not cohesively tear through, or that the tension required for continuation of the adhesively failing tear is lost, there must be no significant relaxation during the period of time needed for the separation procedure.

When applying this principle care must be taken that there is a minimum thickness of adhesive sealant in the particular application, below which the bead is no longer fully adhesive, but rather cohesive, during separation of the attachment. Because the width of the sealing bed, and thus the adhesive sealant bead, cannot be arbitrarily small, the thickness of said bead thus decreases with a reduction in cross-sectional area. The basis for such a minimal value for the width of the sealing bed can lie with construction requirements, or simply with the circumstance that application technology does not allow a smaller bead to be created. The withdrawal force is directly proportional to the width of a bead, since this withdrawal force is proportional to the adhesively active, wetted surface. If the withdrawal force exceeds the maximum tear strength of the material, the tear strength being directly proportional to the bead cross-sectional area, then cohesive, and therefore undesired, failure appears. This simplified view disregards boundary effects, for example, so that additional safety measures must be provided for practical use. The relationship for calculating the minimum adhesive sealant thickness of an adhesive sealant bead, wetted on both sides, can be expressed as follows:

$$i.\ d_{min}/(mm) = i.\ \frac{F_s/(N/mm)}{F_{Rm}/(N/mm^2)} \quad (II)$$

where $d_{min}$ is the thickness of the adhesive sealant between two substrates arranged plane-parallel,
  i. $F_s$ is the peel force, and
  ii. $F_{Rm}$ is the maximum tear strength.

At very low temperatures, for example at −30° C., the adhesive is not yet brittle or too hard, since otherwise the capability to cohesively transmit forces suddenly increases greatly, without the adhesion being able to increase to the same extent. Sufficient low-temperature flexibility, therefore, is necessary according to the invention.

In comparison, for processing of particularly preferred hot-melt adhesive sealant substances as a special form of the adhesives, it is important that said substance is sufficiently fluid above the maximum assumed working temperature, in order to be applied using the customary application apparatus.

A conventional hot-melt adhesive sealant may not be processable by tank melt units at the specified, sufficient strength at room temperature. The desired characteristic profile according to the present invention be obtained using polyisobutylene for low-temperature flexibility, resins for adhesion to the substrates, thermoplastic elastomers for cohesive strength, and the melt liquid in combination with optional, partially grafted poly-α-olefins.

Thermoplastic elastomers are generally known from the current art. Among these, it is understood that polymers, also called thermoplastic rubber, ideally possess a combination of functional properties of elastomers and the processing properties of thermoplastics.

This can be achieved when soft and elastic segments with a simultaneous high ductility and a low glass transition temperature, as well as hard, crystallizable segments with low ductility, high glass transition temperature, and a tendency for complex formation are present in the corresponding plastics. Thermally labile, reversibly cleavable crosslinking sites, primarily of a physical, but also of a chemical nature, are characteristic of thermoplastic elastomers. Thermoplastic elastomers are preferably selected, according to the invention, from types of styrene, in particular SBS, SIS, SEBS, SEPS, and block polystyrene-(block poly(ethylene-butylene)), and block polystyrene-(block poly(ethylene-butylene)) having 1 to 10 block styrene units per molecule, which optionally are modified with block polyisoprene or block butadiene units, as well as elastomer alloys, in particular EPDM/PP, NR/PP, EVA/PVDC, and NBR/PP, in addition to polyurethane, polyether esters, and polyether amides. Thermoplastic elastomers have a particular effect on the cohesive strength of the hot-melt adhesive sealants according to the invention.

The cohesive strength in particular can be increased by the use, according to the invention, of at least partially grafted thermoplastic elastomers when, after the hot-melt adhesive sealant is processed, chemical secondary crosslinking takes place using the thermoplastic elastomers. According to the invention, the cohesive strength at elevated temperatures is thus markedly improved, and the stress relaxation during separation of the attachment is kept low.

In a preferred embodiment of the present invention, the optionally grafted poly-α-olefins are selected from amorphous poly-α-olefins, from monopolymers, copolymers, or terpolymers of the monomers ethylene, propylene, 1-butene, 1-pentene, and 1-hexene, or from a poly-α-olefin of the general formula (I):

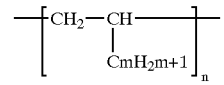

where
m=0 to 15 and
n=5 to 50,000

These polyolefins specify the required adhesion to the substrates. It is particularly preferred that said poly-α-olefins are semicrystalline, so that particularly preferred poly-α-olefins, especially polyethylene, polypropylene, and/or poly-1-butene have high tacticity in the crystalline region.

The poly-α-olefins previously defined and the thermoplastic elastomers can optionally be grafted with additional compounds. Particularly preferred is random grafting with olefinically unsaturated compounds, which in particular are selected from maleic anhydride, itaconic anhydride, tetrahydrophthalic anhydride, and compounds of the general formula (II)

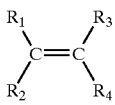

where
R₁ represents the following groups:

a) 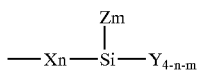

1) where
2) Z is hydrogen, a methyl group, or a phenyl group,
3) where X is —(—$CH_2$—)$_l$— or

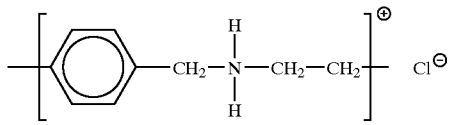

4) Where
5) Y is any given hydrolyzable group,
6) m is a whole number: 0,1, or 2,
7) n is a whole number: 0, 1, or 2, and
8) l is a whole number: 1, 2, 3, 4, 5, or 6; or

9)

b) 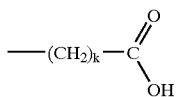

10) where
11) k is a whole number: 0, 1, or 2,
12) R₂ is hydrogen or methyl,
13) R₃ is an R₁ group, hydrogen, or methyl, and
14) R₄ is hydrogen or methyl.

The percentage of grafted poly-α-olefins according to the invention can comprise up to 50% by weight, in particular 10 to 50% by weight, relative to the total content of poly-α-olefins.

The percentage of grafted thermoplastic elastomers, relative to the content of thermoplastic elastomers, can be 0 to 100% by weight.

In addition to the grafted poly-α-olefins, the predominantly modified aliphatic resins are particularly responsible for adhesion to the substrates. These resins are preferably selected from polymerized monomers of the $C_5$ to $C_8$ fractions from petroleum distillation, which are partially, completely or not hydrogenated and natural rosin resins and modifications of same; terpene resins; polyterpene resins of β-pinene, α-pinene, and/or δ-limonene; resins obtained by copolymerization of terpene with monomers from the $C_5$ to $C_9$ fraction from petroleum distillation, and terpene-phenol resins.

The polyisobutylenes used according to the invention are responsible for low-temperature flexibility, as previously mentioned. For purposes of definition, the polyisobutylenes in the sense of this invention include polyisobutylene oils and copolymeric polyisobutylenes in particular. Especially preferred are the polyisobutylenes from homopolymeric isobutylene, particularly from homopolymers of isobutylene of average molecular weight in the range of 20,000 to 5,000,000 g×$mol^{-1}$ (determined by gel permeation chromatography), copolymers of isobutylene and a conjugated diene in quantities of 0.3 to 4.5 mol %, relative to the copolymer, and/or terpolymers of isobutylene, divinylbenzene in quantities of 0.01 to 4.5 mol %, and the named conjugated diene.

The low-temperature flexibility as well as the melt viscosity are determined by means of the oils, as oligomers or polymers, of isobutylene and 1-butene with an average molecular weight of 200 to 20,000 g×$mol^{-1}$ (determined using gel permeation chromatography), and are optimally influenced by naphthalene- or paraffin-based oils recovered from petroleum distillation and optionally modified, in the same molecular weight range. The percentage of the oils according to the invention should lie in the range of 0 to 65% by weight, relative to the hot-melt adhesive sealant.

Furthermore, the hot-melt adhesive sealants according to the invention can contain 0 to 80% by weight, especially 15 to 30% by weight, polyisoprene or polybutadiene, and in particular, grafted polyisoprene or polybutadiene.

In addition to the aforementioned organic polymeric plastic materials, the hot-melt adhesive sealants according to the invention can also contain additional fillers and, in particular, aromatic resins and/or stabilizers, as well as adhesives such as organofunctional silanes, for example.

Particularly preferred is the use of 0 to 50% by weight, especially 0 to 40% by weight, fillers, and/or 0 to 25% by weight, especially 0 to 10% by weight, aromatic resins and/or stabilizers.

The fillers can be selected in particular from inorganic fillers such as calcium carbonate, calcium hydroxide, dolomite, titanium dioxide, zinc oxide, silicon oxide, barium sulfate, and manganese dioxide, as well as organic fillers, in particular carbon black.

The stabilizers and light absorbers optionally contained in the hot-melt adhesive sealants according to the invention are preferably selected from the group of epoxides, sterically hindered phenols, amines, thioesters, phosphites, and triazine-, piperidine-, and benzotriazoles.

ILLUSTRATIVE EXAMPLE

All described raw materials are defined as follows:

Polyisobutylene was placed in a twin-blade kneader and tempered at 150° C. Approximately ¼ of the total quantity of softening oil was added thereto and mixed for approximately 30 minutes. The thermoplastic elastomer was added to this homogenized mass. Necessary end block resins, fillers, and stabilizers were then optionally added, and mixing was performed for an additional 20 minutes. To this was added, in two portions of ½ of each, the adhesive resin and poly-α-olefin, which could be optionally grafted. This mixture was kneaded for an additional 15 minutes after each addition. The remainder, as ½ of the total quantity of said softening oils, was then added and mixed for an additional 30 minutes until a homogenous hot-melt adhesive sealant compound was taken from the kneader.

EXAMPLE FORMULATION 1

| Percent by weight | Material | Description |
|---|---|---|
| 0.4 | 2,6-Di-tert-butyl-4-methyphenol | Stabilizer: |
| 0.02 | Lampblack 101 | Filler: Carbon black, dibutylphthalate absorption 110–115 mL (DPB)/100 g carbon black |
| 3.0 | Vistanex ® MM-L80 | Softening oils and flexibilizers: Polyisobutylene, molecular weight by gel permeation chromatography against polystyrene standard, determined as 830,000 g/mol |
| 30.5 | Parapol ® 1300 | Softening oils and flexibilizers: Polyisobutylene, molecular weight by gel permeation chromatography against polystyrene standard, determined as 2,100 g/mol |
| 25.0 | Kraton ® G 1652 | Thermoplastic elastomers: Linear styrene block polymers of type S-EB-S 29% styrene |
| 6.0 | Vestoplast ® 608 | Poly-α-olefin: Copolymeric poly-α-olefin with high 1-butene content Softening temperature (Ring & Ball) = 90° C., $T_G$ = 31° C. |
| 15.0 | Escorez ® 4401 | Tackifying resins: Aliphatic resin with aromatic groups Softening point (Ring & Ball) = 95° C. |
| 5.0 | Hydrogenated ® P | Tackifying resins: Hydrogenated natural resin, esterified with pentaerythritol Softening point (Ring & Ball) = 109° C. |
| 10.0 | Chalk | Filler |

This material was investigated with regard to its working viscosity, its dynamically-mechanically determined glass transition temperature, and its flow characteristics. In addition, the peel characteristics on clean glass surfaces and freshly drawn polypropylene were determined, whereby this measurement was carried out in the significant range of peel angles <10°. Finally, the elongation characteristics up to the rupture point were recorded in order to use these data to provide the basis for calculation for Equation II, and the hysteresis curve was recorded in order to describe the stress relaxation and the work performed during elongation:

TABLE 1

Peel test of adhesive sealant between glass and PP with example formulation 1

| | |
|---|---|
| Elongation (%) | 203.8 |
| Line width of netted surface (mm) | 24.0 |
| Withdrawal force (N) | 19.6 |
| Peel force $F_s$ (N/mm) | 0.82 |
| Peel-off angle (°) | 0 |

TABLE 2

Elongation and hysteresis test with example formulation 1

| | |
|---|---|
| Tear strength $F_{Rm}$ (N/mm$^2$) | 3.48 |
| At elongation (%) | 1103 |
| Hysteresis energy (J) | 0.062 |

TABLE 3

Viscosity data for exemplary formulation 1

| | Viscosity (Pas) Temperature (° C.) | | |
|---|---|---|---|
| Shear rate γ (1/s) | 170 | 190 | 210 |
| 0.056 | 366 | 97 | 31 |
| 0.10 | 347 | 93 | 31 |
| 0.56 | 243 | 77 | 26 |
| 1.0 | 216 | 67 | 23 |
| 5.6 | 124 | 53 | 18 |
| 10 | 61 | 48 | 17 |

TABLE 4

Viscoelastic data for example formulation 1

| | |
|---|---|
| Glass transition temperature (G" = max.) (° C.) | −38 |
| tan δ (175° C.) | 3.55 |

Processing of the adhesive sealant from exemplary formulation 1 into an attachment:

PROCESSING EXAMPLE 1

Figure 6:
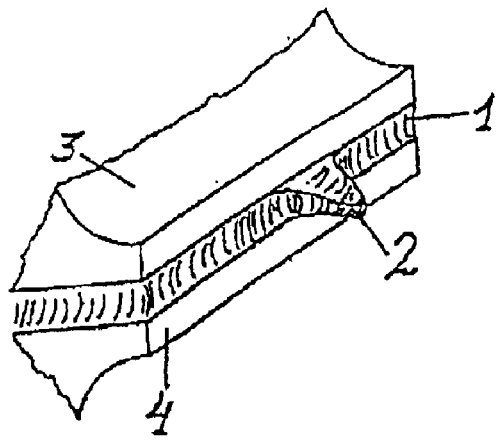
FIG. 6: A three-dimensional representation in a cutaway view of adhesive sealant applied between two plates.
Figure 7:
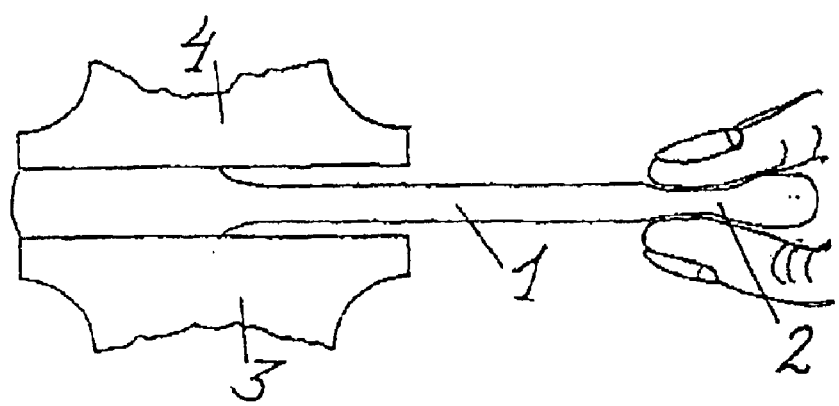
FIG. 7: A side view of the attachment illustrated in FIG. 6, with the adhesive sealant partially withdrawn.
Figure 9:
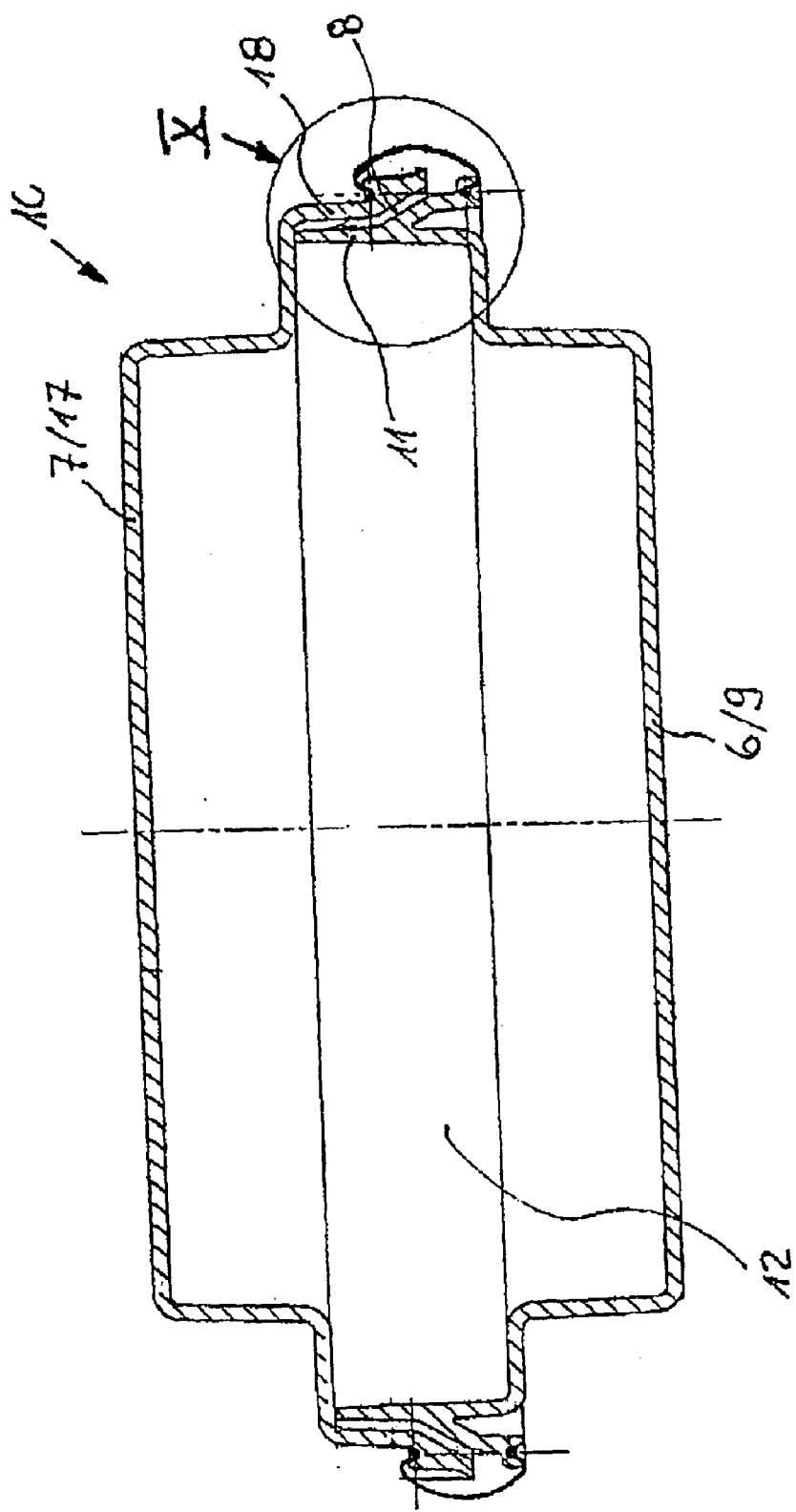
FIG. 9: A side view of the joint illustrated in FIG. 8, in section without adhesive sealant.

In the following example, figures in parentheses refer to the reference numbers of FIGS. 6 and 7.

The adhesive sealant (1) produced and described according to example formulation 1 above was applied from a heat cartridge gun onto a plate (4) made of polypropylene. At the end of the application path, a piece of release paper was coated with the bead end such that a "handle" (2) was formed for subsequent separation of the attachment to be produced. Before the adhesive sealant cooled, another polypropylene plate (3) was placed flat against the first described plate and pressed onto the hot sealant compound, so that the distance between said plates did not exceed 1 mm. After use, the attachment was separated by exerting a pulling force on said "handle" (2) in the direction facing away from the joint interface, but in the plane of said interface. One or both substrates (3), (4) were thus fixed. The hot-melt adhesive sealant (1) could now be pulled residue-free from the joint interface, and the three components were obtained again separated from one another.

PROCESSING EXAMPLE 2

The adhesive sealant produced and described according to the example above was conveyed from an open tank melt unit and applied into the sealing bed of a headlight comprising a glass closure disk and a metallized die-cast reflector. The "handle" was formed by vertical, slow lifting, slightly inclined toward the headlight exterior, of the delivery nozzle while continuing to convey a small amount of the hot-melt adhesive sealant which cooled in the air. The next processing step was to join the reflector with the glass closure disk.

After specified use of the headlight, the "handle," along with the adhesive sealant, was withdrawn from the sealing bed of the headlight by applying a pulling force directed outwardly from the opening of the sealing bed. The headlight was now available for repair by introducing new adhesive sealant, or for material recycling.

The "handle" can be omitted if, for example, a device used as an "opener" is first brought into contact with the adhesive sealant bead to release the attachment. This could be achieved, for example, by pushing said adhesive sealant bead through and pulling same from the sealing bed on a hook formed on said "opener." The attachment was subsequently released in this manner.

What is claimed is:

1. A hot-melt adhesive comprising a non-pressure-sensitive adhesive that is fluid at application temperatures and that is removable, residue-free, by peeling at small peel angles, wherein said adhesive contains additives selected from the group consisting of fillers, stabilizers, dyes, carbon black, and moisture absorbents, said adhesive also containing the following:
   a) thermoplastic elastomers that may be grafted,
   b) grafted poly-α-olefins,
   c) polyisobutylene or a softening oil,
   d) adhesive resin, and
   e) end block resin,
      wherein the adhesive has a tear resistance greater than 800%.

2. The adhesive according to claim 1, wherein the thermoplastic elastomers are styrenes selected from the group consisting of SBS, SIS, SEBS, SEPS, block polystyrene-(block poly(ethylene-butylene)), and block polystyrene-(block poly(ethylene-butylene)) having 1 to 10 block styrene units per molecule, which optionally are modified with block polyisoprene or block butadiene units; elastomer alloys selected from the group consisting of EPDM/PP, NR/PP, EVA/PVDC and NBR/PP; polyurethane; polyether esters or polyamides.

3. The adhesive according to claim 1, wherein the poly-α-olefins are at least partially grafted, and the poly-α-olefins are selected from amorphous poly-α-olefins, monopolymers, copolymers, or terpolymers of monomers of ethylene, propylene, 1-butene, 1-pentene, or 1-hexene, or from a poly-α-olefin of the general formula (I):

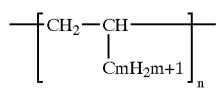

where
m=0 to 15, and
n=5 to 50,000.

4. The adhesive according to claim 3, wherein the poly-α-olefins are semicrystalline, and the poly-α-olefins comprise at least one of polyethylene, polypropylene, or poly-1-butene, which have high tacticity in the crystalline regions.

5. The adhesive according to claim 3 or 4, wherein the poly-α-olefins are randomly grafted with olefinically unsaturated compounds, which are selected from the group consisting of maleic anhydride, itaconic anhydride, tetrahydrophthalic anhydride, and compounds of the general formula (II):

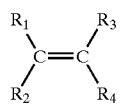

where $R_1$ represents the following groups:

a)

where

Z is hydrogen, a methyl group, or a phenyl group, and
X is —(—$CH_2$—)$_l$— or

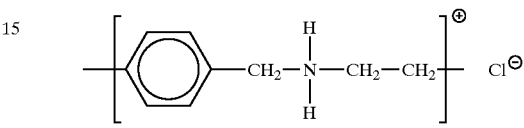

where

Y is a hydrolyzable group,
m 0,1, or 2,
n is 0, 1, or 2, and
1 is 1, 2, 3, 4, 5, or 6; or

9)

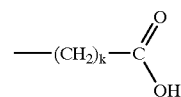

b)

where k is 0, 1, or 2,
$R_2$ is hydrogen or methyl,
$R_3$ is an $R_1$ group, hydrogen, or methyl, and
$R_4$ is hydrogen or methyl.

6. An adhesive according to claim 1, wherein the quantity of grafted poly-α-olefins is 0 to 100% by weight, relative to the total content of poly-α-olefins.

7. The adhesive according to claim 1, wherein the thermoplastic elastomers are randomly grafted with olefinically unsaturated compounds that are selected from maleic anhydride, itaconic anhydride, tetrahydrophthalic anhydride, or compounds of the general formula (II):

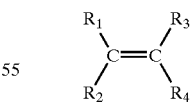

where $R_1$ represents the following groups:

a)

where
Z is hydrogen, a methyl group, or a phenyl group, and
X is —(—CH$_2$—)$_1$— or

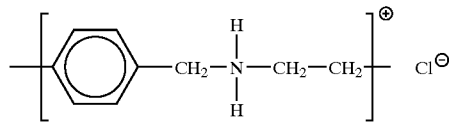

where
Y is a hydrolyzable group,
m 0,1, or 2,
n is 0, 1, or 2, and
1 is 1, 2, 3, 4, 5, or 6; or b)
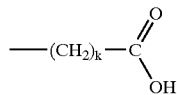

where
k is 0, 1, or 2,
R$_2$ is hydrogen or methyl,
R$_3$ is an R$_1$ group, hydrogen, or methyl, and
R$_4$ is hydrogen or methyl.

8. The adhesive according to claim 1, wherein the percentage of grafted thermoplastic elastomers, relative to the total content of the thermoplastic elastomers, is 0 to 100% by weight.

9. The adhesive according to claim 1, wherein the adhesive resins are selected from polymeric monomers of the petrochemical C$_5$ to C$_9$ distillation fractions, which are not hydrated partially hydrated, or completely hydrated, natural rosin resins, modified natural rosin resins, terpene resins, polyterpene resins of β-pinene, α-pinene, and/or δ-limonene; resins obtained by copolymerization of terpene with monomers from the C$_5$ to C$_9$ fraction from petroleum distillation, or terpene-phenol resins.

10. The adhesive according to claim 1, wherein the polyisobutylenes are at least one selected from the group consisting of homopolymers of isobutylene of average molecular weight in the range of 20,000 to 5,000,000 g×mol$^{-1}$ (determined by gel permeation chromatography), copolymers of isobutylene and a conjugated diene in quantities of 0.3 to 4.5 mol % (relative to said copolymer), and terpolymers of isobutylene, divinylbenzene in quantities of 0.01 to 4.5 mol %.

11. The adhesive according to claim 1, wherein the polyisobutylenes or softening oils are at least one selected from the group consisting of polyisobutylenes, oligomers or polymers of isobutylene or 1-butene, and modified naphthalene- or paraffin-based oils recovered from petroleum distillation with an average molecular weight in the range of 200 to 20,000 g×mol$^{-1}$ (determined using gel permeation chromatography).

12. The adhesive according to claim 1, wherein said adhesive contains:
f) 0 to 80% by weight, or 15 to 70% by weight of polyisoprene, polybutadiene, grafted polyisoprene or polybutadiene.

13. The adhesive according to claim 1, wherein said adhesive contains:
g) 0 to 50% by weight, preferably 0 to 40% by weight, fillers; and
h) 0 to 25% by weight, preferably 0 to 10% by weight, aromatic resins and/or stabilizers.

14. The adhesive according to claim 13, wherein the fillers are inorganic fillers selected from the group consisting of calcium carbonate, calcium hydroxide, calcium oxide, dolomite, titanium dioxide, zinc oxide, silicon oxide, barium sulfate, and manganese dioxide; or the fillers are an organic filler which is preferably carbon black.

15. The adhesive according to claim 13, wherein the stabilizers are selected from the group consisting of epoxides, sterically hindered phenols, amines, thioesters, phosphites, triazinetriazoles, piperidinetriazoles and benzotriazoles.

16. The adhesive according to claim 1, wherein said adhesives contain adhesives comprising at least one of epoxy resins, silicones, polysulfides, polyurethanes, polyureas, or acrylates.

17. An adhesive method which comprises:
attaching glass-like substrates to thermoplastic or duroplastic plastic substrates using the adhesive set forth in claim 1.

18. The method according to claim 17, wherein the glass-like plastic substrates are selected from polymethyl methacrylate, polycarbonate, or cycloolefin copolymer, or said plastic substrates comprise polypropylene.

19. The method according to claim 17 or 18, wherein light disks or headlight lenses are releasably attached to lamp housings of automobile lights or automobile headlights.

20. In automobile lights or automobile headlights comprising light disks or headlight lenses, preferably having a scratch-resistant finish, composed of a glass-like plastic substrate, and lamp housings composed of a thermoplastic or duroplastic plastic substrate, wherein said light disks or headlight lenses and lamp housings are attached to the adhesive of claim 1.

* * * * *